US009983534B2

(12) United States Patent
Takahashi et al.

(10) Patent No.: US 9,983,534 B2
(45) Date of Patent: May 29, 2018

(54) MOTOR CONTROL DEVICE, DRIVING DEVICE, CONVEYOR DEVICE, IMAGE FORMING APPARATUS, MOTOR CONTROL METHOD, AND COMPUTER-READABLE RECORDING MEDIUM

(71) Applicants: Motoharu Takahashi, Kanagawa (JP); Yoshihiro Asano, Kanagawa (JP); Takuya Murata, Tokyo (JP); Shingo Nagatsuka, Kanagawa (JP); Kentaroh Kurosu, Kanagawa (JP)

(72) Inventors: Motoharu Takahashi, Kanagawa (JP); Yoshihiro Asano, Kanagawa (JP); Takuya Murata, Tokyo (JP); Shingo Nagatsuka, Kanagawa (JP); Kentaroh Kurosu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/275,743

(22) Filed: Sep. 26, 2016

(65) Prior Publication Data
US 2017/0090386 A1   Mar. 30, 2017

(30) Foreign Application Priority Data
Sep. 28, 2015 (JP) ................... 2015-190143

(51) Int. Cl.
*H02P 1/54* (2006.01)
*G03G 15/00* (2006.01)
*H02P 6/30* (2016.01)

(52) U.S. Cl.
CPC ........ *G03G 15/6529* (2013.01); *G03G 15/50* (2013.01); *H02P 6/30* (2016.02); *G03G 15/80* (2013.01); *G03G 2215/0129* (2013.01)

(58) Field of Classification Search
CPC .................................. G05B 15/02; H02P 6/08
See application file for complete search history.

(56) References Cited

U.S. PATENT DOCUMENTS

2010/0196073 A1* 8/2010 Taki ....................... B65H 29/14
399/405
2013/0200836 A1   8/2013 Ishizuka et al.
(Continued)

FOREIGN PATENT DOCUMENTS

JP         3962556       5/2007
JP         2010-074923   4/2010
JP         2017-017979 A 1/2017

*Primary Examiner* — Karen Masih
(74) *Attorney, Agent, or Firm* — Harness, Dickey & Pierce, P.L.C.

(57) ABSTRACT

A motor control device for driving a motor, the motor control device includes: a receiver configured to receive, from an external source, a drive command containing a rotation direction command designating a rotation direction of the motor; a storage part configured to store the rotation direction of the motor indicated by the rotation direction command when the motor is driven using the rotation direction command; and a controller configured to, when a new piece of the drive command is received from the external source, control rotation reversing of the motor based on a rotation direction of the motor indicated by the rotation direction command contained in the received piece of the drive command and the rotation direction of the motor stored in the storage part.

14 Claims, 9 Drawing Sheets

(56) References Cited

U.S. PATENT DOCUMENTS

| | | |
|---|---|---|
| 2013/0200838 A1 | 8/2013 | Seki et al. |
| 2013/0257341 A1 | 10/2013 | Suzuki et al. |
| 2014/0361715 A1 | 12/2014 | Murata |
| 2015/0130385 A1 | 5/2015 | Ishizuka et al. |
| 2015/0142377 A1* | 5/2015 | Kishida .................... G01B 7/30 |
| | | 702/151 |
| 2015/0185736 A1 | 7/2015 | Suzuki et al. |
| 2016/0164443 A1 | 6/2016 | Murata |

* cited by examiner

MOTOR CONTROL DEVICE, DRIVING DEVICE, CONVEYOR DEVICE, IMAGE FORMING APPARATUS, MOTOR CONTROL METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2015-190143 filed Sep. 28, 2015. The contents of which are incorporated herein by reference in their entirety.

BACKGROUND OF THE INVENTION

1. Field of the Invention

The present invention relates generally to motor control devices, driving devices, conveyor devices, image forming apparatuses, motor control methods, and computer-readable recording media.

2. Description of the Related Art

It is known that certain types of conventional image forming apparatuses are equipped with a plurality of motors including a motor for conveying paper for use in image forming. Known techniques for controlling such a motor include the following. That is, a CPU (Central Processing Unit) transmits a control signal, such as a PWM (Pulse Width Modulation) signal, corresponding to a control voltage to be applied to the motor to a motor driver. The motor driver drives the motor in accordance with the control signal.

However, such an image forming apparatus is disadvantageous in that, if a motor is started to rotate in reverse direction when the motor is rotating (including when the motor is decelerating), because a counterelectromotive force and a voltage applied to drive the motor are in the same direction, a high voltage is undesirably applied to an armature, which can result in breakdown of the motor.

To avoid this disadvantage, a motor control device that prevents a motor that is rotating from being started to rotate in reverse direction is disclosed in, for example, Japanese Patent No. 3962556. The motor control device of Japanese Patent No. 3962556 is configured to, even when a rotor of a permanent-magnet brushless direct-current motor is rotating in a reverse direction opposite to a designated rotation direction, reverse the rotation direction of the motor, thereby rotating the motor in the designated rotation direction.

However, the motor control device of Japanese Patent No. 3962556 is disadvantageous in that it is necessary to detect the rotation direction of the motor to determine whether or not to start up the motor.

Therefore, there is a need to provide a motor control device, a driving device, a conveyor device, an image forming apparatus, a motor control method, and a computer-readable recording medium capable of controlling rotation reversing of a rotating motor without detecting a rotation direction of the motor.

SUMMARY OF THE INVENTION

According to exemplary embodiments of the present invention, there is provided a motor control device for driving a motor, the motor control device comprising: a receiver configured to receive, from an external source, a drive command containing a rotation direction command designating a rotation direction of the motor; a storage part configured to store the rotation direction of the motor indicated by the rotation direction command when the motor is driven using the rotation direction command; and a controller configured to, when a new piece of the drive command is received from the external source, control rotation reversing of the motor based on a rotation direction of the motor indicated by the rotation direction command contained in the received piece of the drive command and the rotation direction of the motor stored in the storage part.

Exemplary embodiments of the present invention also provide a driving device that includes the above-described motor control device, wherein the driving device further includes: a motor; a motor driver configured to receive a control signal for controlling driving of the motor and drive the motor; and a control-signal output part configured to output the control signal generated based on a drive command received from an external source, the drive command containing a rotation direction command designating a rotation direction of the motor, and a rotation signal, the rotation signal corresponding to a rotational speed of the motor, to the motor driver.

Exemplary embodiments of the present invention also provide a conveyor device that includes the above-described motor control device, wherein the conveyor device further includes: a motor configured to actuate a conveying mechanism; a motor driver configured to receive a control signal for controlling driving of the motor and drive the motor; and a control-signal output part configured to output the control signal generated based on a drive command received from an external source, the drive command containing a rotation direction command designating a rotation direction of the motor, and a rotation signal, the rotation signal corresponding to a rotational speed of the motor, to the motor driver.

Exemplary embodiments of the present invention also provide an image forming apparatus that includes the above-described motor control device, wherein the image forming apparatus further includes: a motor; a motor driver configured to receive a control signal for controlling driving of the motor and drive the motor; and a control-signal output part configured to output the control signal generated based on a drive command received from an external source, the drive command containing a rotation direction command designating a rotation direction of the motor, and a rotation signal, the rotation signal corresponding to a rotational speed of the motor, to the motor driver.

Exemplary embodiments of the present invention also provide a motor control method to be performed by a motor control device for driving a motor, the motor control device including a storage part, the motor control method comprising: receiving a drive command containing a rotation direction command designating a rotation direction of the motor from an external source; storing, in the storage part, the rotation direction of the motor indicated by the rotation direction command when the motor is driven using the rotation direction command; and controlling, when a new piece of the drive command is received from the external source, control rotation reversing of the motor based on a rotation direction of the motor indicated by a rotation direction command contained in the received piece of the drive command and the rotation direction of the motor stored in the storage part.

Exemplary embodiments of the present invention also provide a non-transitory computer-readable recording medium containing instructions that, when executed by a computer for driving a motor, the computer including a storage part, cause the computer to perform: receiving a drive command containing a rotation direction command designating a rotation direction of the motor from an external source; storing, in the storage part, the rotation direction of the motor indicated by the rotation direction command when the motor is driven using the rotation direction command; and controlling, when a new piece of the drive command is received from the external source, rotation reversing of the motor based on a rotation direction of the motor indicated by a rotation direction command contained in the received piece of the drive command and the rotation direction of the motor stored in the storage part.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
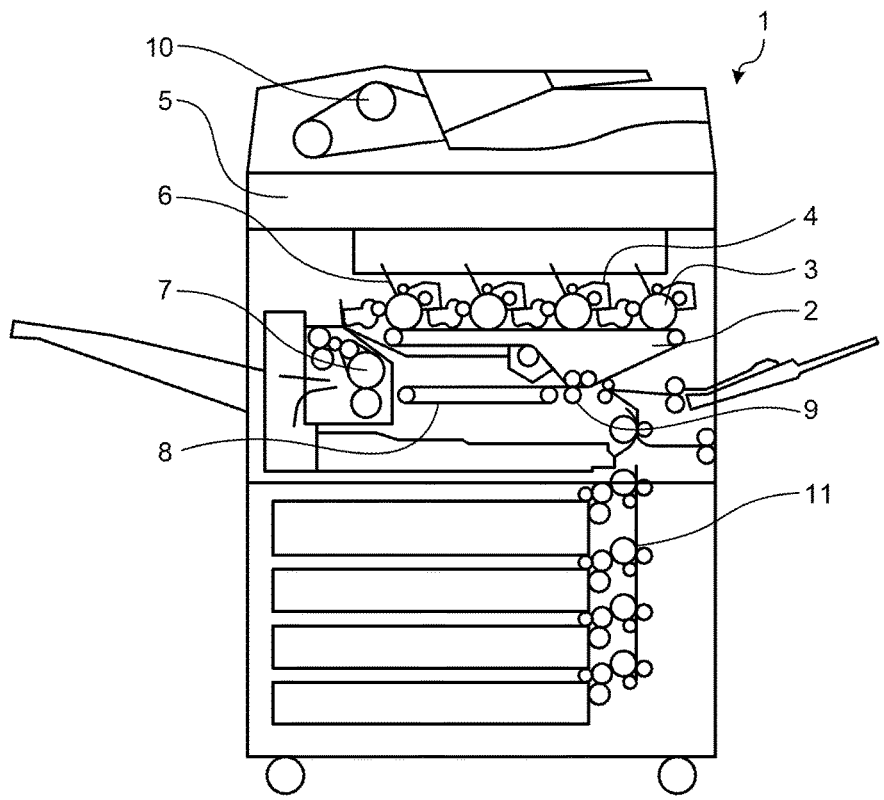
FIG. 1 a schematic configuration diagram of an image forming apparatus according to a first embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention are described in detail below with reference to the accompanying drawings. Hereinafter, an example where an image forming apparatus according to an aspect of the present invention is applied to an intermediate-transfer tandem color copier is described.

First Embodiment

FIG. 1 a schematic configuration diagram of an image forming apparatus according to a first embodiment. As illustrated in FIG. 1, an image forming apparatus 1 of the first embodiment performs image reading using a scanner section 5 by, for example, scanning an original document while irradiating the original document with a light emitted from a light source and receiving light reflected off the original document with a three-line CCD (Charge Coupled Devices) sensor.

Alternatively, image reading from an original document may be performed while conveying the original document using an ADF (Automatic Document Feeder) 10. The thus-read image data undergoes image processing, which may include scanner gamma correction, color transformation, image separation, and gray-level correction, performed by an image processing unit and thereafter sent to an image writing unit 6.

The image writing unit 6 modulates driving of an LD (Laser Diode) in accordance with the image data. A photoconductor unit 3 writes a latent image to a uniformly-charged rotating photoconductor drum with a laser beam emitted from the LD. A developing unit 4 develops the latent image into a visible image by causing toner to stick to the latent image.

The image formed on the photoconductor drum is further transferred onto a transfer belt of a primary transfer unit of a primary transfer section 2. In full-color copying, toners of four colors (Bk: black, C: cyan, M: magenta, and Y: yellow) are overlaid on one another on the primary transfer belt.

In full-color copying, at a point in time when the image formation process and the transfer process for the four colors (Bk, C, M, and Y) are completed, transfer paper is fed from a paper feeding section 11 with timing adjusted with the primary transfer belt. A paper transfer section 9 transfers the toners of the four colors collectively from the primary transfer belt onto the transfer paper.

The transfer paper, onto which the toners have been transferred, is conveyed via a conveying section 8 to a fixing section 7, where the toners are thermally fixed by a fixing roller and a pressing roller, and then ejected.

In the image forming apparatus 1 configured as described above, the ADF 10 functions as "conveyor device" that conveys an original document. The conveyor device (the ADF 10) includes a conveying mechanism that conveys a sheet (the original document) by rotating a roller member with motive power provided by a motor. The image forming apparatus 1 of the first embodiment includes a driving device that controls driving of the motor that actuates the conveying mechanism of the conveyor device. The driving device is described below.

Figure 2:
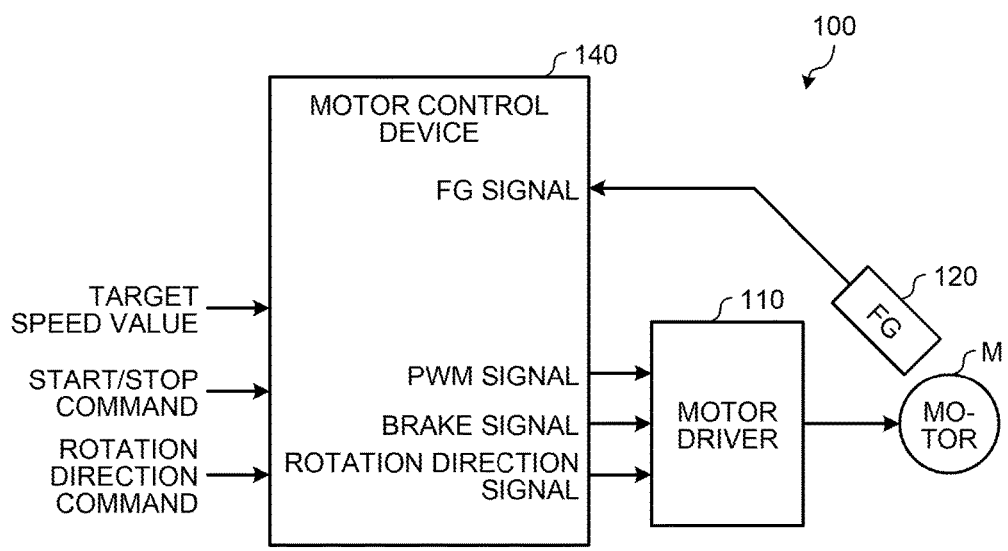
FIG. 2 is a hardware configuration diagram of a driving device of the first embodiment.

FIG. 2 is a hardware configuration diagram of a driving device 100 of the first embodiment. As illustrated in FIG. 2, the driving device 100 of the first embodiment includes a motor M, a motor driver 110 that drives the motor M, an FG (Frequency Generator) 120 for use in detecting a rotational speed of the motor M, and a motor control device 140 that controls the motor M via the motor driver 110.

In the image forming apparatus 1 of the first embodiment, the motor M is used to drive the developing unit 4, the photoconductor unit 3, the primary transfer section 2, the fixing section 7, and the ADF 10 illustrated in FIG. 1, and the like. In the first embodiment, a brushless motor is used as the motor M, which is an entity (hereinafter, "controlled entity") controlled by the driving device 100. The motor M, or the controlled entity, is not limited to a brushless motor, but can be of various types.

The motor driver 110 includes a switching circuit, to which terminals of windings of the motor M are connected, and drives the motor M. Specifically, the motor driver 110 drives the motor M at a desired control voltage by controlling operation of the switching circuit in accordance with a PWM signal fed from the motor control device 140.

Furthermore, the motor driver 110 controls operation of the switching circuit so as to stop the motor M when "ON" state of a brake signal fed from the motor control device 140 occurs. Furthermore, the motor driver 110 switches switching elements, which are involved in the control, in the switching circuit in accordance with a rotation direction signal (i.e., a signal indicating a rotation direction of the motor M) fed from the motor control device 140.

In the first embodiment, an example where a PWM signal is used as a control signal transmitted from the motor control device 140 to the motor driver 110. However, the control signal is not limited to a PWM signal and can be any signal corresponding to a control voltage to be applied to the motor M. For example, the control signal may be a PFM signal (pulse frequency signal) or, further alternatively, may be an analog signal.

The motor driver 110 includes, at least, a terminal to which the PWM signal is to be fed, a terminal to which a brake signal is to be fed, and a terminal to which a rotation direction signal indicating a rotation direction of the motor M is to be fed. The terminal to which a PWM signal is to be fed, the terminal to which a brake signal is to be fed, and the terminal to which a rotation direction signal is to be fed, are respectively connected to a control-signal output part 143 (which will be described later) of the motor control device 140 via harnesses.

The FG 120 outputs an FG signal (rotation signal) corresponding to a rotational speed of the motor M for detection of the rotational speed of the motor M. Another scheme, with which the rotational speed of the motor M is detectable, may alternatively be used. For example, the rotational speed of the motor M may be detected using a single-phase encoder or the like.

The motor control device 140 includes a CPU and a ROM. A target speed value, a start/stop command, and a rotation direction command are fed from a higher CPU (which corresponds to "external source") are fed to the motor control device 140. An FG signal is fed from the FG 120 to the motor control device 140. The target speed value is a target value indicating a desired speed of the motor M. The start/stop command is a command for starting (i.e., starting driving of) the motor M and a command for stopping driving of the motor M. The rotation direction command is a command designating a rotation direction of the motor M.

Furthermore, the motor control device 140 controls operation of the motor driver 110 by outputting the PWM signal, the brake signal, and the rotation direction signal to the motor driver 110. In the first embodiment, the motor control device 140 receives a drive command containing a target speed value, a start/stop command, and a rotation direction command from the higher CPU. The motor control device 140 may receive a set of the target speed value and the rotation direction command as a target position.

In the first embodiment, the motor control device 140, the motor driver 110, the FG 120, and the motor M function as "driving device".

Figure 3:
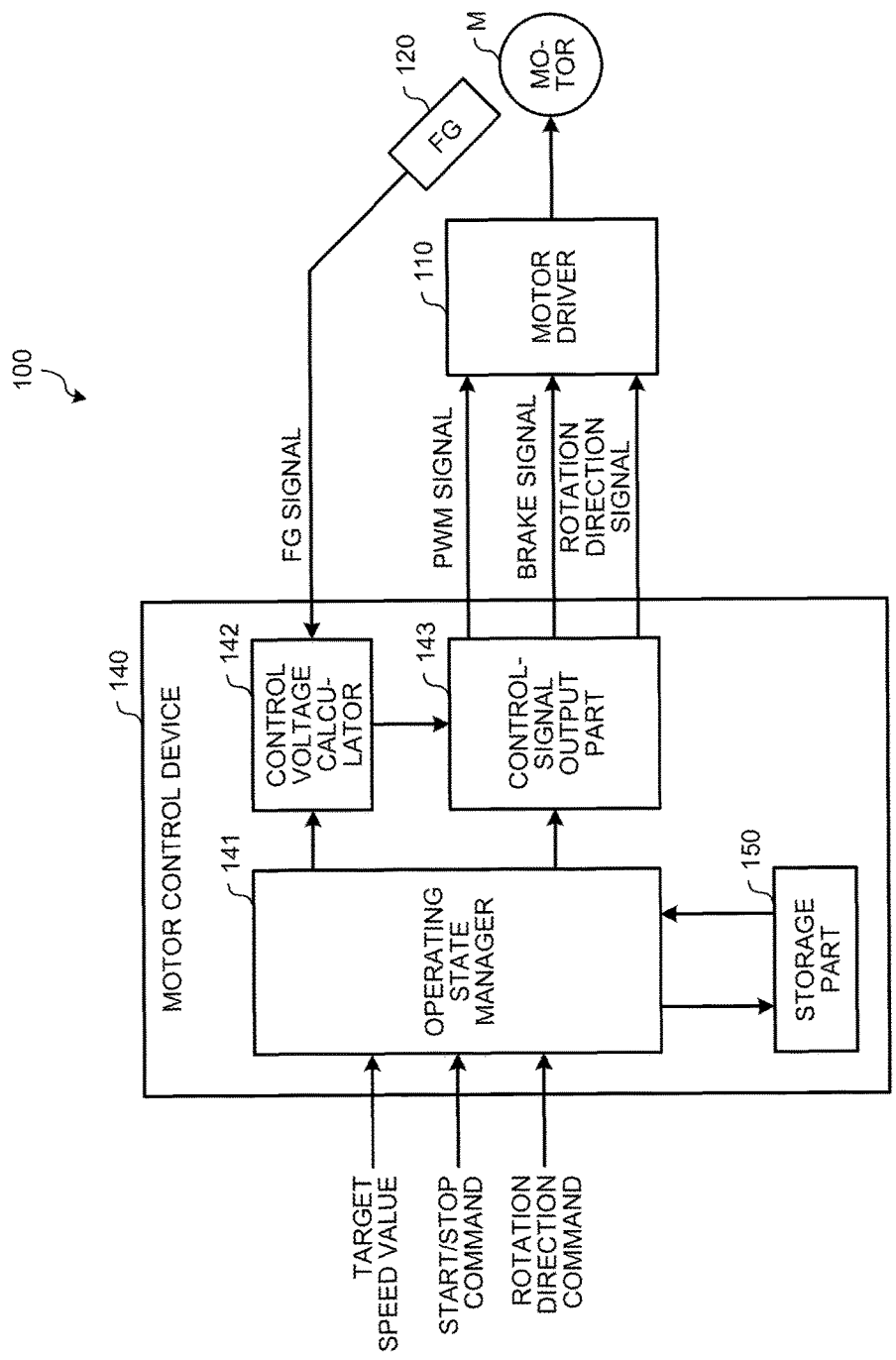
FIG. 3 is a block diagram illustrating a functional configuration of a motor control device of the first embodiment.

FIG. 3 is a block diagram illustrating a functional configuration of the motor control device of the first embodiment. As illustrated in FIG. 3, the motor control device 140 includes, as functional components involved in motor control of the first embodiment, an operating state manager 141, a control voltage calculator 142, and the control-signal output part 143. These functional components are implemented by, for example, the CPU of the motor control device 140 by executing predetermined control instructions stored in the ROM of the motor control device 140. The motor control device 140 includes a storage part 150.

A part or all of the functional components of the motor control device 140 may be implemented by dedicated hardware, e.g., an ASIC (Application Specific Integrated Circuit) or an FPGA (Field-Programmable Gate Array), rather than by the CPU, which is a general-purpose processor.

When a drive command containing a target speed value, a start/stop command, and a rotation direction command of the motor M is received by the operating state manager 141 from the higher CPU and the motor M is driven using the received rotation direction command, the storage part 150 stores a rotation direction of the motor M indicated by the rotation direction command. The storage part 150 is connected to the operating state manager 141 of the motor control device 140.

The operating state manager 141 receives a drive command for the motor M from the higher CPU. Upon receiving a drive command, the operating state manager 141 manages a start-state/stop-state of the motor M and issues instructions to the functional components. Specifically, the operating state manager 141 issues instructions to the control voltage calculator 142 and the control-signal output part 143 so as to bring the motor M to an operating state indicated by the command fed from the higher CPU. The drive command received from the higher CPU includes a start/stop command, a target speed value, and a rotation direction command as described above.

Specifically, upon being fed with a command to start up the motor M from the higher CPU, the operating state manager 141 instructs the control-signal output part 143 to bring the brake signal to "OFF" state. Furthermore, the operating state manager 141 passes the target speed value and the rotation direction command, which are fed from the higher CPU together with the command to start up the motor M, to the control voltage calculator 142 and instructs the control voltage calculator 142 to calculate a value of the control voltage to be applied to the motor M.

Upon being fed with a command to stop the motor M from the higher CPU, the operating state manager 141 instructs the control-signal output part 143 to bring the brake signal to "ON" state, thereby stopping the motor M. When a defective condition of the motor M is encountered, the operating state manager 141 sends a notice of the defective condition to the higher CPU.

Upon receiving a new drive command from the higher CPU, the operating state manager 141 controls rotation reversing of the motor M that is rotating based on a rotation direction of the motor M indicated by a rotation direction command contained in the received drive command and the rotation direction of the motor M stored in the storage part 150. The operating state manager 141 functions as "receiver" and "controller".

Specifically, for example, if the rotation direction of the motor M indicated by the rotation direction command contained in the received drive command is the same as the current rotation direction of the motor M stored in the storage part 150, the operating state manager 141 starts up the motor M in the same direction.

For example, if the rotation direction of the motor M indicated by the rotation direction command contained in the received drive command is the reverse of the current rotation direction of the motor M stored in the storage part 150 and the rotational speed of the motor M is equal to or smaller than a predetermined threshold value, the operating state manager 141 starts up the motor M in the reverse direction. The predetermined threshold value is a value of the current rotational speed of the motor M, at which reverse starting is possible, and can be set as desired.

The control voltage calculator 142 calculates the control voltage value to be applied to the motor M by comparing the current rotational speed of the motor M indicated by the FG signal fed from the FG 120 against the target speed value that is fed together with the instruction to calculate the control voltage value from the operating state manager 141 so that speed error is corrected. The control voltage value calculated by the control voltage calculator 142 is passed to the control-signal output part 143.

The control-signal output part 143 outputs, as a control signal, a PWM signal corresponding to the control voltage value calculated by the control voltage calculator 142 to the motor driver 110. Furthermore, the control-signal output part 143 outputs, as a control signal, a brake signal, whose ON/OFF state is controlled by the operating state manager 141, to the motor driver 110.

Furthermore, the control-signal output part 143 outputs, as a control signal, a rotation direction signal generated based on the rotation direction of the motor M indicated by the rotation direction command contained in a drive command received from the higher CPU and the rotational speed of the motor M indicated by the FG signal to the motor driver 110.

The PWM signal, the brake signal, and the rotation direction signal output by the control-signal output part 143 are sent from the motor control device 140 to the motor driver 110 respectively via the harnesses and applied to the terminals of the motor driver 110 as described above.

Figure 4A:
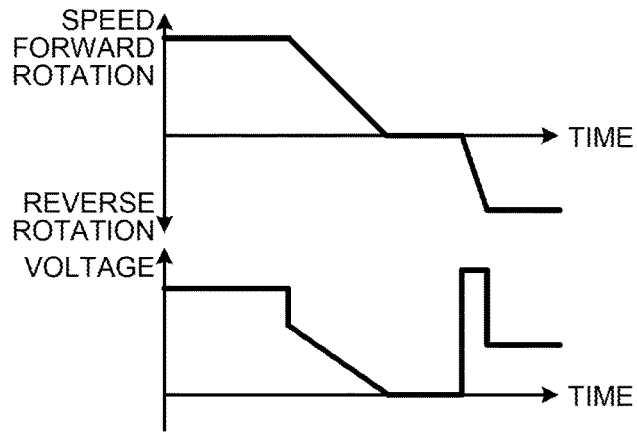
FIG. 4A is an explanatory diagram of a voltage in a case where reverse starting of a motor of the first embodiment is performed.
Figure 4B:
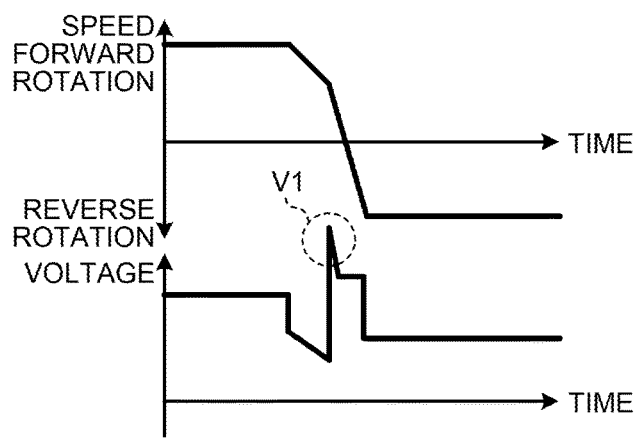
FIG. 4B is an explanatory diagram of a voltage in a case where reverse starting of the motor of the first embodiment is performed.
Figure 4C:
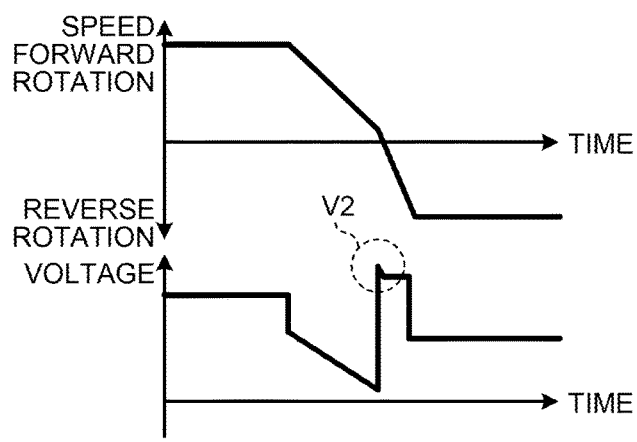
FIG. 4C is an explanatory diagram of a voltage in a case where reverse starting of the motor of the first embodiment is performed.

Voltages in reverse starting of the motor M are described below. FIG. 4A, FIG. 4B, and FIG. 4C are explanatory diagrams of voltages in cases where reverse starting of the motor of the first embodiment is performed.

FIG. 4A is a diagram illustrating a voltage in a case where reverse starting of the motor M is performed after the motor M has stopped completely. As illustrated in FIG. 4A, comparison between before and after reverse starting of the motor M indicates that a high-voltage spike is not applied to the motor M, and the motor M is started favorably.

FIG. 4B is a diagram illustrating a voltage in a case where reverse starting of the motor M is performed when the motor M is decelerating. As illustrated in FIG. 4B, comparison between before and after reverse starting of the motor M indicates that when the motor M is started in reverse direction, because a counterelectromotive force and a starting voltage are summed, a high voltage is applied to the motor M (see V1). FIG. 4B thus indicates that the applied voltage is higher than that applied to the motor M started in reverse direction from a stop state of the motor M.

FIG. 4C is a diagram illustrating a voltage in a case where reverse starting of the motor M is performed when it is detected that the speed of the motor M that is decelerating has decreased to a value equal to or smaller than the predetermined threshold value. As illustrated in FIG. 4C, comparison between before and after reverse starting of the motor M indicates that a voltage lower than that of FIG. 4B is applied to the motor M. Specifically, the voltage applied to the motor M of FIG. 4C (see V2) is higher than the voltage applied to the motor M of FIG. 4A but lower than the voltage applied to the motor M of FIG. 4B.

Figure 5A:
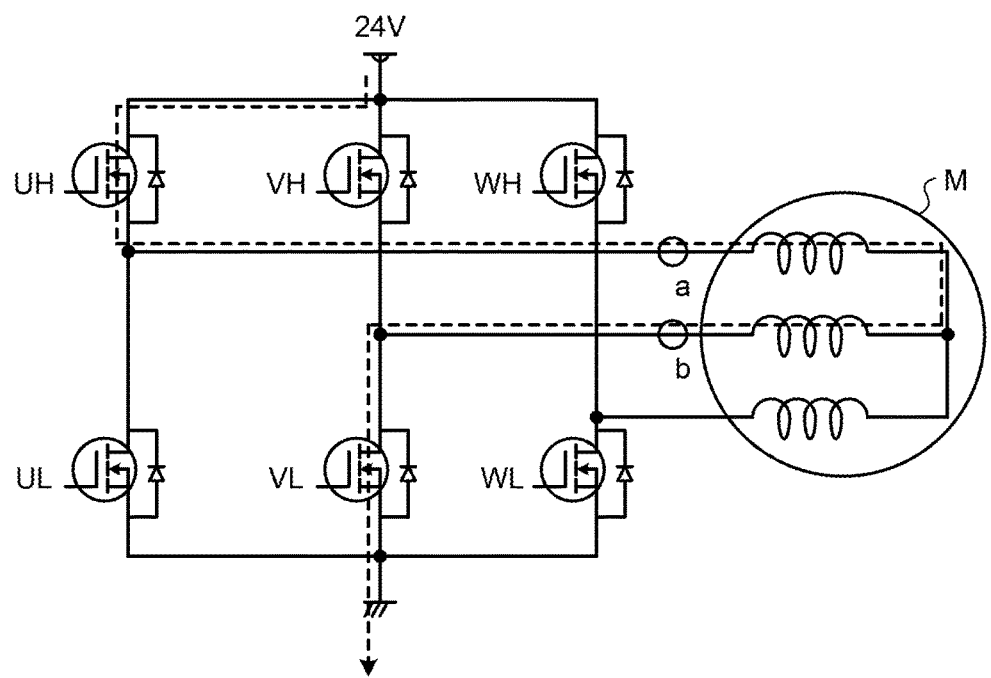
FIG. 5A is an explanatory diagram of a voltage applied to the motor of the first embodiment.
Figure 5B:
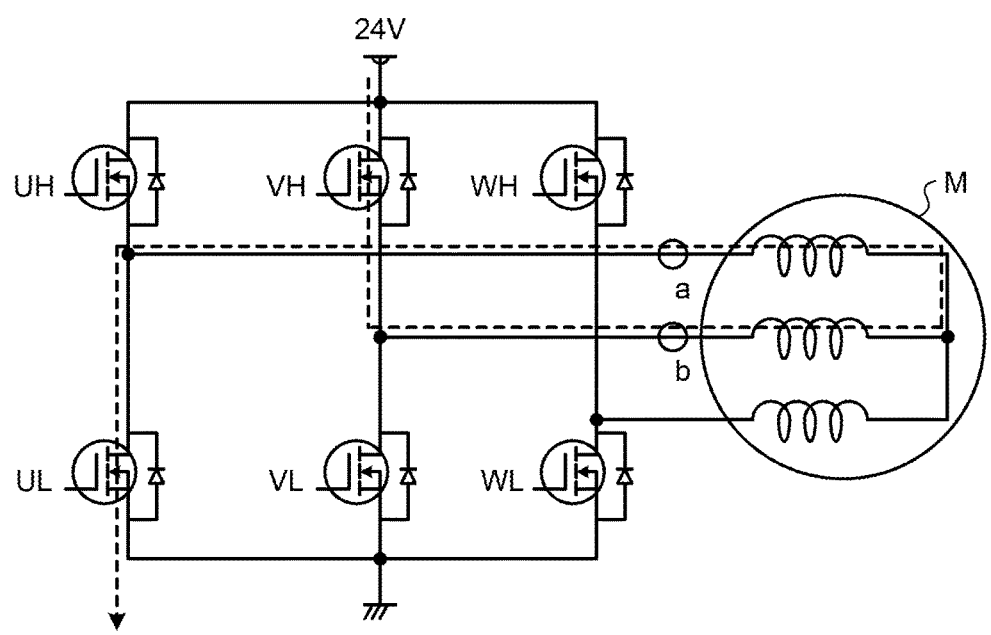
FIG. 5B is an explanatory diagram of a voltage applied to the motor of the first embodiment.

The motor M is described below. FIG. 5A and FIG. 5B are explanatory diagrams of voltages applied to the motor of the first embodiment. The voltages of FIG. 4A to FIG. 4C are the voltages between a and b of FIG. 5A and FIG. 5B.

FIG. 5A illustrates a state where the motor M is driven in forward direction. As illustrated in FIG. 5A, an electric current flows as indicated by the dashed line because UH and VL are ON.

FIG. 5B illustrates a state where the motor M is driven in reverse direction. As illustrated in FIG. 5B, an electric current flows as indicated by the dashed line because UL and VH are ON. Thus, starting up the motor M that is driven in the forward direction in the reverse direction causes a counterelectromotive force generated by the forward rotation and a voltage for the reverse rotation to be summed.

Figure 6:
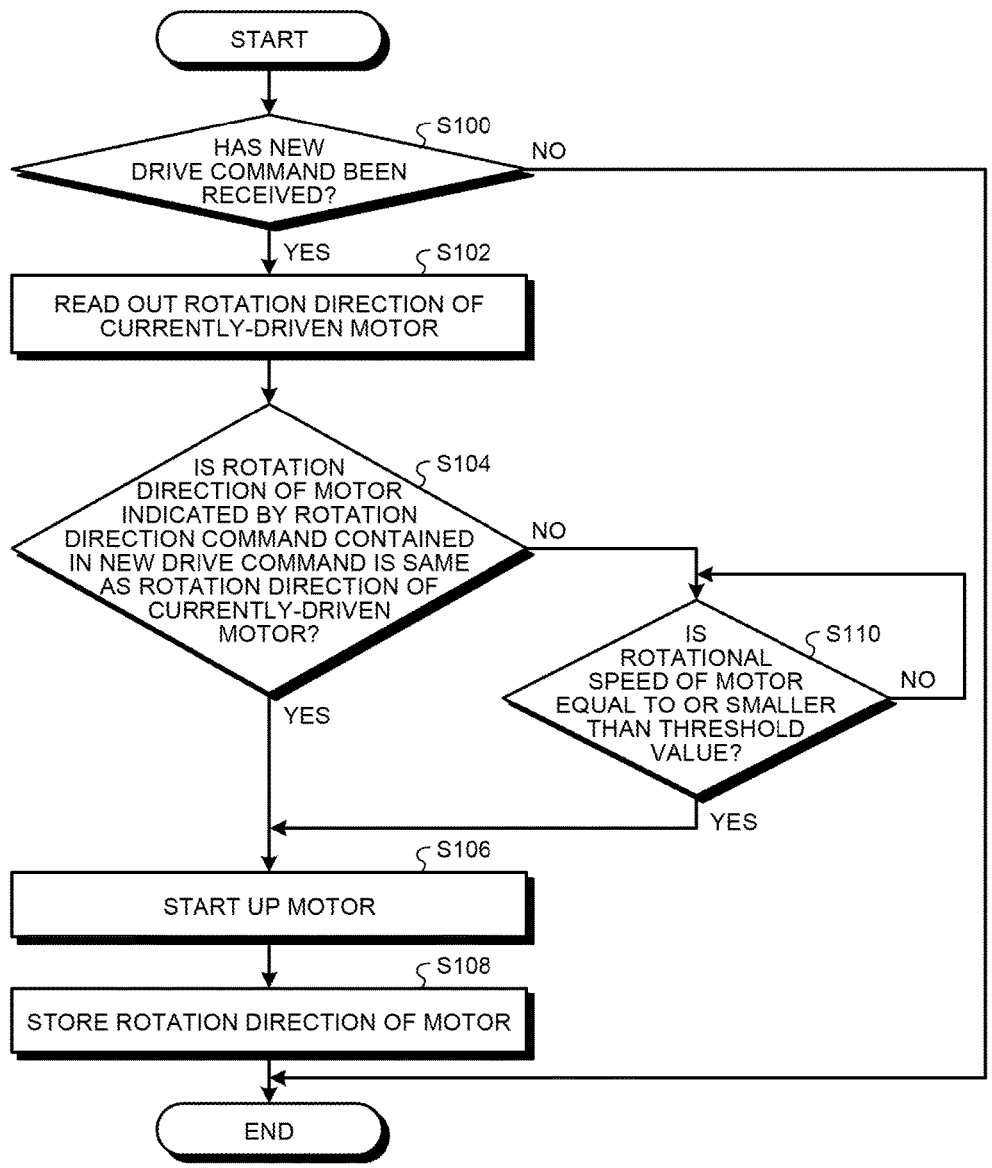
FIG. 6 is a flowchart illustrating a procedure of a process of starting the motor in reverse direction performed by the motor control device of the first embodiment.

A process of starting the motor M in reverse direction is described below. FIG. 6 is a flowchart illustrating a procedure of a process of starting the motor in reverse direction performed by the motor control device of the first embodiment. In FIG. 6, reverse starting of the motor M is performed after the rotational speed of the motor M has decreased to a value equal to or smaller than a predetermined threshold value.

First, the operating state manager 141 determines whether or not a new drive command has been received from the higher CPU (step S100). If a new drive command has not been received (No at step S100), the process of starting the motor in reverse direction is ended.

If a new drive command has been received (Yes at step S100), the operating state manager 141 reads out a rotation direction of the currently-driven motor M from the storage part 150 (step S102). The operating state manager 141 determines whether a rotation direction of the motor M indicated by a rotation direction command contained in the new drive command is the same as or the reverse of the rotation direction of the currently-driven motor M (step S104).

If the rotation direction of the motor M indicated by the rotation direction command contained in the new drive command is the same as the rotation direction of the currently-driven motor M (Yes at step S104), the control voltage calculator 142 calculates a control voltage value to be applied to the motor M. The control-signal output part 143 outputs a PWM signal corresponding to the control voltage value to the motor driver 110 to start up the motor M (step S106). The operating state manager 141 stores the rotation direction of the motor M in the storage part 150 (step S108).

If the rotation direction of the motor M indicated by a rotation direction command contained in the new drive command is the reverse of the rotation direction of the currently-driven motor M (No at step S104), the operating state manager 141 determines whether or not the current rotational speed of the motor M is equal to or smaller than the predetermined threshold value (step S110). If the current rotational speed of the motor M is equal to or smaller than the predetermined threshold value (Yes at step S110), processing proceeds to step S106.

If the current rotational speed of the motor M is larger than the predetermined threshold value (No at step S110), processing is put on hold until the speed decreases to a value equal to or smaller than the threshold value.

As described above, the motor control device 140 of the first embodiment receives a drive command containing a rotation direction command designating a rotation direction of the motor M from an external source and, when the motor M is driven using the rotation direction command, stores the rotation direction of the motor M indicated by the rotation direction command in the storage part 150. When a new drive command for the motor M is received when the motor M is rotating, the motor control device 140 reads out the rotation direction of the currently-driven motor M stored in the storage part 150, and compares the rotation direction of the currently-driven motor M against a rotation direction of the motor M indicated by a rotation direction command contained in the drive command. If the rotation directions are the same, or if, even when the rotation directions are opposite, the rotational speed of the motor M is equal to or smaller than the predetermined threshold value, the motor control device 140 starts up the motor M. If the rotation directions are opposite and the rotational speed of the motor M is larger than the predetermined threshold value, the motor control device 140 puts processing on hold until the rotational speed of the motor M decreases to a value equal to or smaller than the threshold value. Hence, it is possible to control rotation reversing of the motor M that is rotating without detecting a rotation direction of the motor M each time a new drive command is received. As a result, breakdown of the motor M can be avoided.

Second Embodiment

The first embodiment is configured such that in a case where a rotation direction of the motor M indicated by a rotation direction command contained in a newly received drive command is the reverse of a rotation direction of the currently-driven motor M and a rotational speed of the motor M is larger than the predetermined threshold value, processing is put on hold until the rotational speed of the motor M decreases to a value equal to or smaller than the threshold value. In contrast, in a second embodiment, reverse starting of the motor M is not performed in the above case.

A driving device 200 of the second embodiment is similar in hardware configuration to the driving device 100 of the first embodiment.

Figure 7:
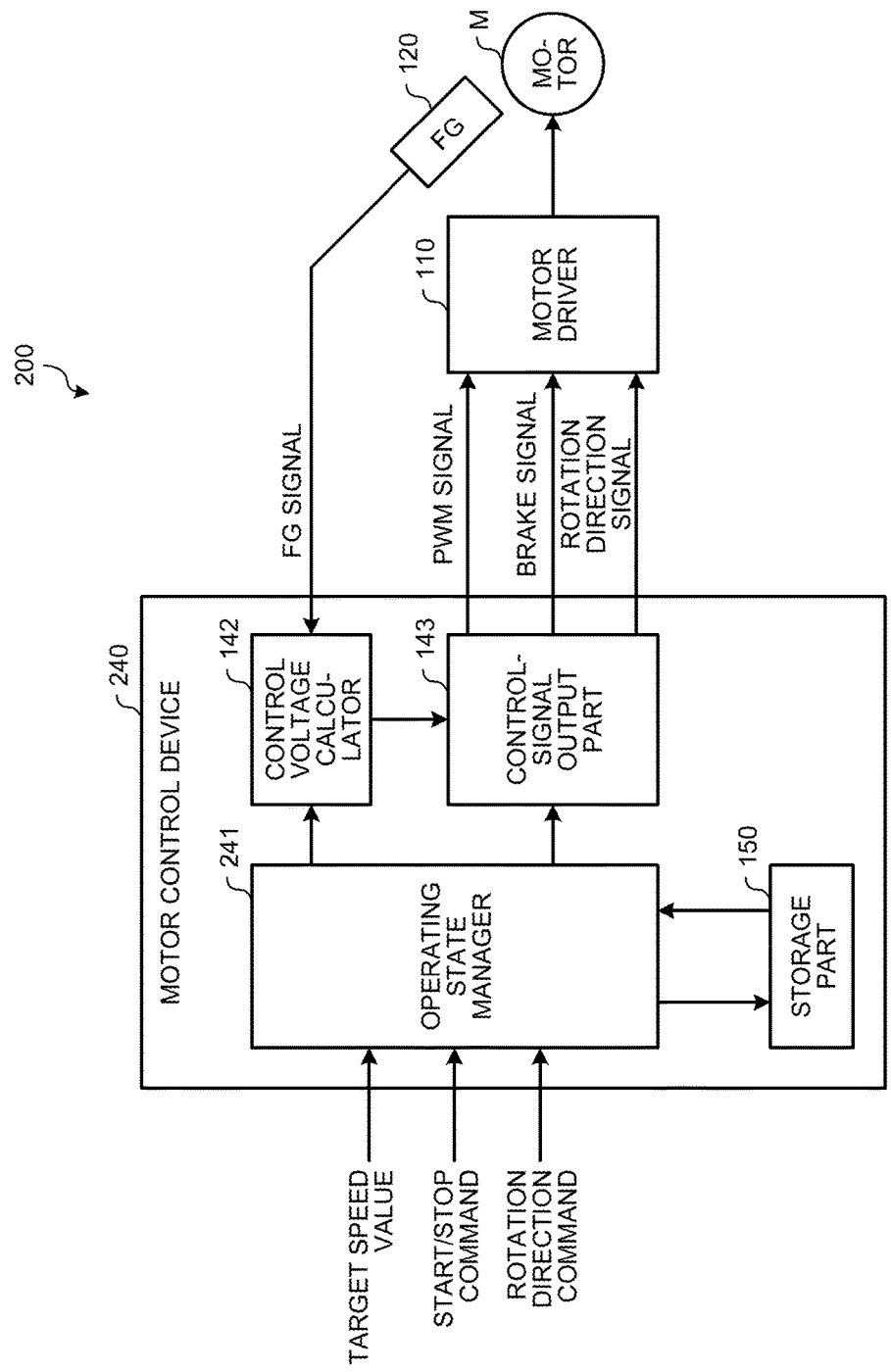
FIG. 7 is a block diagram illustrating a functional configuration of a motor control device of a second embodiment of the present invention.

FIG. 7 is a block diagram illustrating a functional configuration of a motor control device of the second embodiment. As illustrated in FIG. 7, a motor control device 240 includes, as functional components involved in motor control of the second embodiment, an operating state manager 241, the control voltage calculator 142, and the control-signal output part 143. The motor control device 240 further includes the storage part 150. Configurations and functions of the control voltage calculator 142, the control-signal output part 143, and the storage part 150 are similar to those of the first embodiment.

The operating state manager 241 receives a drive command for the motor M from a higher CPU as in the first embodiment. Upon receiving a drive command, the operating state manager 241 manages a start-state/stop-state of the motor M and issues instructions to the functional components. Specifically, the operating state manager 241 issues instructions to the control voltage calculator 142 and the control-signal output part 143 so as to bring the motor M to an operating state indicated by the command fed from the higher CPU. The drive command received from the higher CPU includes a start/stop command, a target speed value, and a rotation direction command as described above.

Specifically, upon being fed with a command to start up the motor M from the higher CPU, the operating state manager 241 instructs the control-signal output part 143 to bring the brake signal to "OFF" state. Furthermore, the operating state manager 241 passes the target speed value and the rotation direction command, which are fed from the higher CPU together with the command to start up the motor M, to the control voltage calculator 142 and instructs the control voltage calculator 142 to calculate a control voltage value to be applied to the motor M.

Upon being fed with a command to stop the motor M from the higher CPU, the operating state manager 241 instructs the control-signal output part 143 to bring the brake signal to "ON" state, thereby stopping the motor M. When a defective condition of the motor M is encountered, the operating state manager 241 sends a notice of the defective condition to the higher CPU.

Upon receiving a new drive command from the higher CPU, the operating state manager 241 controls rotation reversing of the motor M that is rotating based on a rotation direction of the motor M indicated by a rotation direction command contained in the received drive command and the rotation direction of the motor M stored in the storage part 150. The operating state manager 241 functions as "receiver" and "controller".

Specifically, for example, if the rotation direction of the motor M indicated by the rotation direction command contained in the received drive command is the same as the current rotation direction of the motor M stored in the storage part 150, the operating state manager 241 starts up the motor M in the same direction.

For example, if the rotation direction of the motor M indicated by the rotation direction command contained in the received drive command is the reverse of the current rotation direction of the motor M stored in the storage part 150 and a rotational speed of the motor M is larger than a predetermined threshold value, the operating state manager 241 does not start up the motor M in the reverse direction. The operating state manager 241 then sends a notice that starting the motor M is not performed to the higher CPU.

Figure 8:
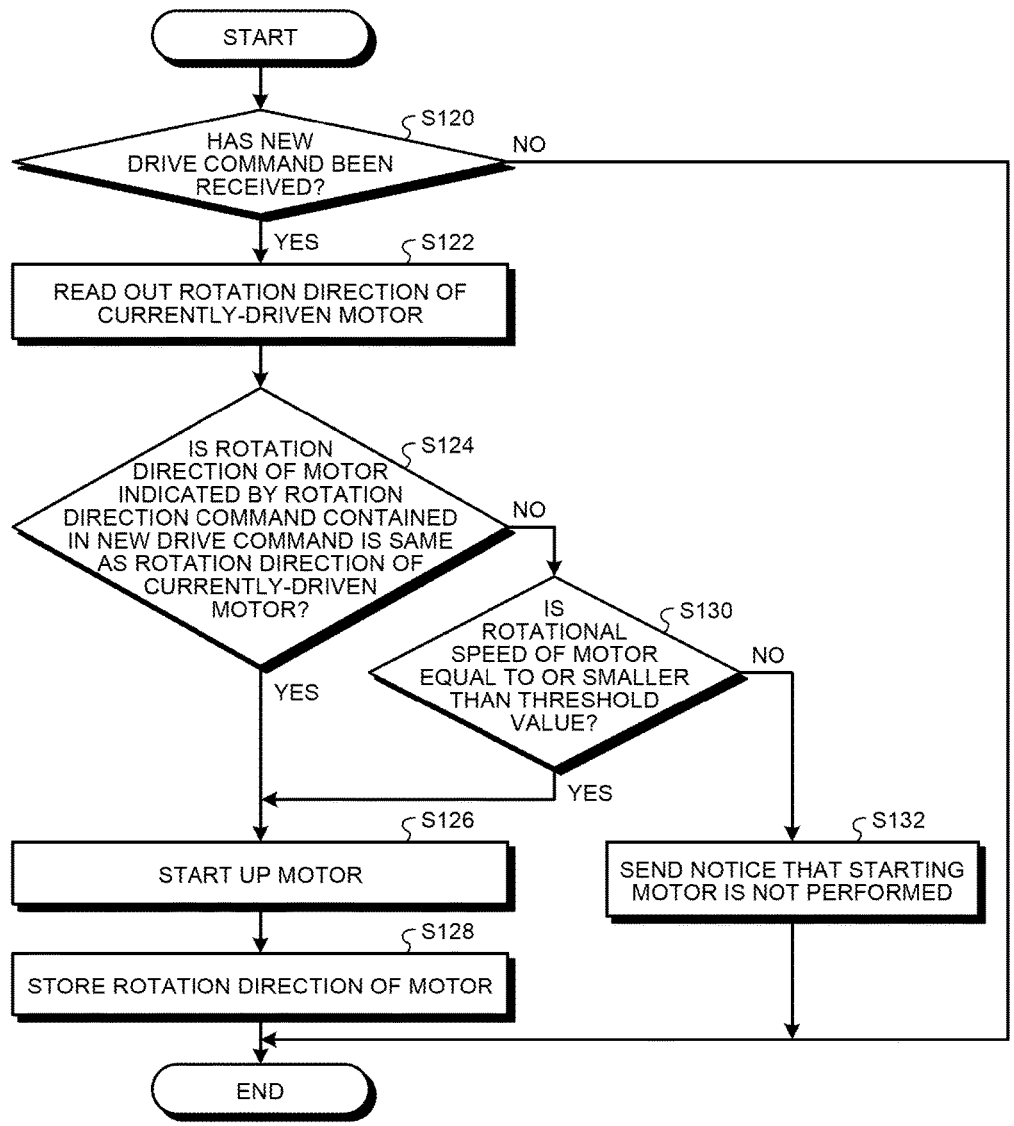
FIG. 8 is a flowchart illustrating a procedure of a process of starting the motor in reverse direction performed by the motor control device of the second embodiment.

A process of starting the motor M in reverse direction is described below. FIG. 8 is a flowchart illustrating a procedure of a process of starting the motor in reverse direction performed by the motor control device of the second embodiment. In FIG. 8, reverse starting of the motor M is performed when the rotational speed of the motor M is equal to or smaller than the predetermined threshold value, but the motor M is not started when the rotational speed is larger than the predetermined threshold value.

Processing from determining whether or not a new drive command has been received to storing a rotation direction of the motor M (step S120 to step S128) is similar to that of the first embodiment (FIG. 6) and repeated description is omitted (see step S100 to step S108).

If a rotation direction of the motor M indicated by a rotation direction command contained in the new drive command is the reverse of the rotation direction of the currently-driven motor M (No at step S124), the operating state manager 241 determines whether or not the current rotational speed of the motor M is equal to or smaller than the predetermined threshold value (step S130). If the current rotational speed of the motor M is equal to or smaller than the predetermined threshold value (Yes at step S130), processing proceeds to step S126.

If the current rotational speed of the motor M is larger than the predetermined threshold value (No at step S130), the operating state manager 241 sends a notice that starting the motor M is not performed to the higher CPU (step S132).

As described above, the motor control device 240 of the second embodiment receives a drive command containing a rotation direction command designating a rotation direction of the motor M from an external source and, when the motor M is driven using the rotation direction command, stores the rotation direction of the motor M indicated by the rotation direction command in the storage part 150. When a new drive command for the motor M is received when the motor M is rotating, the motor control device 240 reads out the rotation direction of the currently-driven motor M stored in the storage part 150, and compares the rotation direction of the currently-driven motor M against a rotation direction of the motor M indicated by a rotation direction command contained in the drive command. If the rotation directions are the same, or if, even when the rotation directions are opposite, the rotational speed of the motor M is equal to or smaller than the predetermined threshold value, the motor control device 240 starts up the motor M. If the rotation directions are opposite and the rotational speed of the motor M is larger than the predetermined threshold value, the motor control device 240 does not start up the motor M in reverse direction and sends a notice about this to the higher CPU. Hence, it is possible to control rotation reversing of the motor M that is rotating without detecting a rotation direction of the motor M each time a new drive command is received. As a result, breakdown of the motor M can be avoided. Furthermore, because the notice that the motor M is not started is sent to the higher CPU, the higher apparatus (the higher CPU) can keep track of a status of the lower apparatus (the driving device 200).

Third Embodiment

The first embodiment is configured such that in a case where a rotation direction of the motor M indicated by a rotation direction command contained in a newly received drive command is the reverse of a rotation direction of the currently-driven motor M and a rotational speed of the motor M is larger than the predetermined threshold value, processing is put on hold until the rotational speed of the motor M decreases to a value equal to or smaller than the threshold value. In contrast, in a third embodiment, in the above case, the motor M is started with a limitation imposed on a control voltage of the motor M.

A driving device 300 of the third embodiment is similar in hardware configuration to the driving device 100 of the first embodiment.

Figure 9:
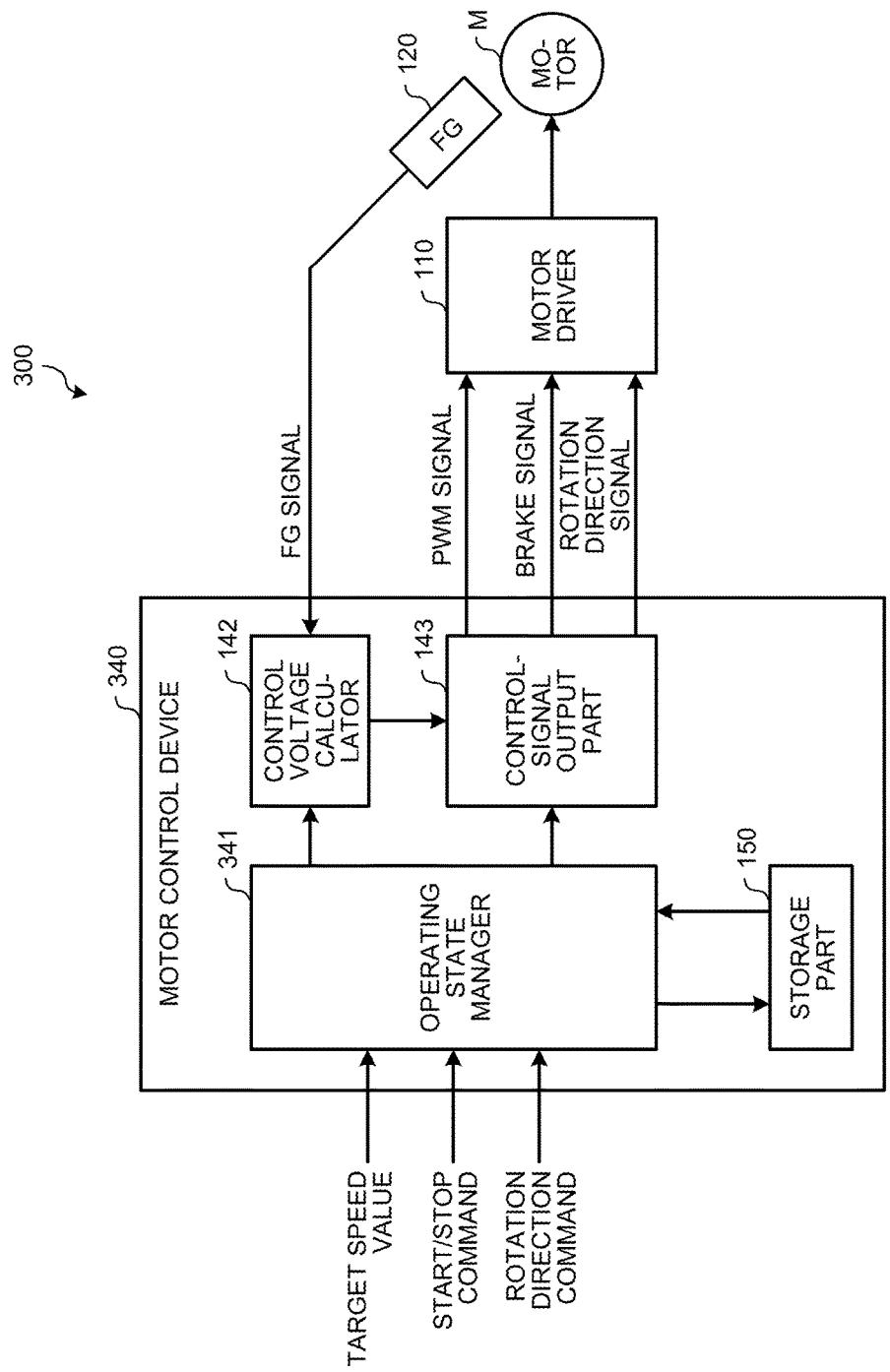
FIG. 9 is a block diagram illustrating a functional configuration of a motor control device of a third embodiment of the present invention.

FIG. 9 is a block diagram illustrating a functional configuration of a motor control device of the third embodiment. As illustrated in FIG. 9, a motor control device 340 includes, as functional components involved in motor control of the third embodiment, an operating state manager 341, the control voltage calculator 142, and the control-signal output part 143. The motor control device 340 further includes the storage part 150. Configurations and functions of the control voltage calculator 142, the control-signal output part 143, and the storage part 150 are similar to those of the first embodiment.

The operating state manager 341 receives a drive command for the motor M from a higher CPU as in the first embodiment. Upon receiving a drive command, the operating state manager 341 manages a start-state/stop-state of the motor M and issues instructions to the functional components. Specifically, the operating state manager 341 issues instructions to the control voltage calculator 142 and the control-signal output part 143 so as to bring the motor M to an operating state indicated by the command fed from the higher CPU. The drive command received from the higher CPU includes a start/stop command, a target speed value, and a rotation direction command as described above.

Specifically, upon being fed with a command to start up the motor M from the higher CPU, the operating state manager 341 instructs the control-signal output part 143 to bring the brake signal to "OFF" state. Furthermore, the operating state manager 341 passes the target speed value and the rotation direction command, which are fed from the higher CPU together with the command to start up the motor M, to the control voltage calculator 142 and instructs the control voltage calculator 142 to calculate a control voltage value to be applied to the motor M.

Upon being fed with a command to stop the motor M from the higher CPU, the operating state manager 341 instructs the control-signal output part 143 to bring the brake signal to "ON" state, thereby stopping the motor M. When a defective condition of the motor M is encountered, the operating state manager 341 sends a notice of the defective condition to the higher CPU.

Upon receiving a new drive command from the higher CPU, the operating state manager 341 controls rotation reversing of the motor M that is rotating based on a rotation direction of the motor M indicated by a rotation direction command contained in the received drive command and the rotation direction of the motor M stored in the storage part 150. The operating state manager 341 functions as "receiver" and "controller".

Specifically, for example, if the rotation direction of the motor M indicated by the rotation direction command contained in the received drive command is the same as the current rotation direction of the motor M stored in the storage part 150, the operating state manager 341 starts up the motor M in the same direction.

For example, if the rotation direction of the motor M indicated by the rotation direction command contained in the received drive command is the reverse of the current rotation direction of the motor M stored in the storage part 150 and a rotational speed of the motor M is larger than a predetermined threshold value, the operating state manager 341 starts up the motor M in the reverse direction with a limitation, which depends on the rotational speed of the motor M, imposed on the control voltage. An upper limit to the control voltage of the motor M can be set depending on the rotational speed of the motor M.

Figure 10:
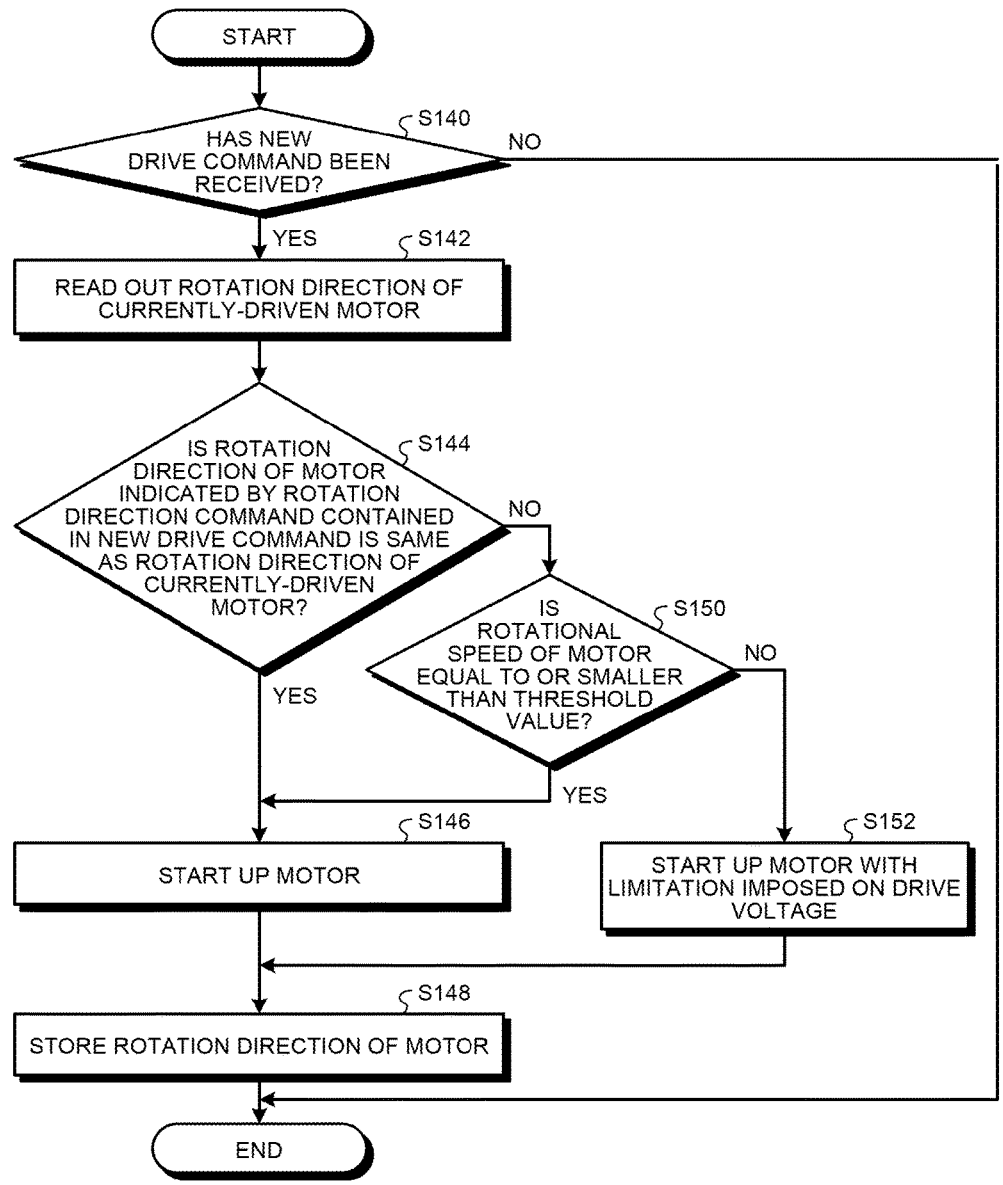
FIG. 10 is a flowchart illustrating a procedure of a process of starting the motor in reverse direction performed by the motor control device of the third embodiment.

A process of starting the motor M in reverse direction is described below. FIG. 10 is a flowchart illustrating a procedure of a process of starting the motor in reverse direction performed by the motor control device of the third embodiment. In FIG. 10, the motor M is started with no limitation imposed on the control voltage if the rotational speed of the motor M is equal to or smaller than the predetermined threshold value, but the motor M is started with a limitation imposed on the control voltage if the rotational speed is larger than the predetermined threshold value.

Processing from determining whether or not a new drive command has been received to storing a rotation direction of the motor M (step S140 to step S148) is similar to that of the first embodiment (FIG. 6) and repeated description is omitted (see step S100 to step S108).

If a rotation direction of the motor M indicated by a rotation direction command contained in the new drive command is the reverse of the rotation direction of the currently-driven motor M (No at step S144), the operating state manager 341 determines whether or not the current rotational speed of the motor M is equal to or smaller than the predetermined threshold value (step S150). If the current rotational speed of the motor M is equal to or smaller than the predetermined threshold value (Yes at step S150), processing proceeds to step S146.

If the current rotational speed of the motor M is larger than the predetermined threshold value (No at step S150), the operating state manager 341 starts up the motor M with a limitation, which depends on the rotational speed of the motor M, imposed on the control voltage (step S152). The operating state manager 341 stores the rotation direction of the motor M in the storage part 150 (step S148).

Thus, the motor control device 340 of the third embodiment receives a drive command containing a rotation direction command designating a rotation direction of the motor M from an external source and, when the motor M is driven using the rotation direction command, stores the rotation direction of the motor M indicated by the rotation direction command in the storage part 150. When a new drive command for the motor M is received when the motor M is rotating, the motor control device 340 reads out the rotation direction of the currently-driven motor M stored in the storage part 150, and compares the rotation direction of the currently-driven motor M against a rotation direction of the motor M indicated by a rotation direction command contained in the drive command. If the rotation directions are the same, or if, even when the rotation directions are opposite, the rotational speed of the motor M is equal to or smaller than the predetermined threshold value, the motor control device 340 starts up the motor M. If the rotation directions are opposite and the rotational speed of the motor M is larger than the predetermined threshold value, the motor control device 340 starts up the motor M with a limitation, which depends on the rotational speed of the motor M, imposed on the control voltage. Hence, it is possible to control rotation reversing of the motor M that is rotating without detecting a rotation direction of the motor M each time a new drive command is received. As a result, breakdown of the motor M can be avoided. Furthermore, by virtue of imposing a limitation, which depends on the rotational speed of the motor M, on the control voltage, rotation reversing of the motor M can be performed safely.

Instructions for the motor control (hereinafter, "motor control instructions") to be executed by the motor control device of each of the first to third embodiments may be provided in a form of preinstalled in a ROM or the like. The motor control instructions to be executed by the motor control device of each of the first to third embodiments may be configured to be provided as an installable file or an executable file recorded in a non-transitory computer-readable recording medium, such as a CD-ROM, a flexible disk (FD), a CD-R, and a DVD (Digital Versatile Disk).

The motor control instructions to be executed by the motor control device of each of the first to third embodiments may be configured to be stored on a computer connected to a network, such as the Internet, and provided by being downloaded via the network. The motor control instructions to be executed by the motor control device of each of the first to third embodiments may be configured to be provided or delivered via a network, such as the Internet.

The motor control instructions to be executed by the motor control device of each of the first to third embodiments are configured in modules including the above-described parts (the operating state manager, the control voltage calculator, and the control-signal output part). From an actual hardware perspective, the CPU (processor) reads out the instructions from the ROM and executes the instructions to load the parts into a main storage device, thereby generating the parts on the main storage device. A part or all of the functions of the above-described parts may be implemented in dedicated hardware circuit, for example.

The embodiments have been described through an example where an image forming apparatus according to an aspect of the present invention is applied to the copier. An image forming apparatus according to an aspect of the present invention is applicable to any image forming apparatus, such as a multifunction peripheral having at least two functions of a copier function, a printer function, a scanner function, and a facsimile function, a copier, a printer, a scanner apparatus, and a facsimile apparatus, that uses a motor.

According to an aspect of the present invention, it is advantageously possible to control rotation reversing of a motor that is rotating without detecting a rotation direction of the motor.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A motor control device for driving a motor, the motor control device comprising:
   a receiver configured to receive, from an external source, a drive command containing a rotation direction command designating a first rotation direction of the motor;
   a storage part configured to store the first rotation direction of the motor indicated by the rotation direction command when the motor is driven using the rotation direction command; and
   a controller configured to, when a new piece of the drive command is received from the external source, control rotation reversing of the motor based on a second rotation direction and the first rotation direction, the second rotation direction being indicated in a new rotation direction command included in the new piece of the drive command.

2. A driving device comprising:
   the motor control device according to claim 1;
   the motor;
   a motor driver configured to receive a control signal for controlling driving of the motor and drive the motor; and
   a control-signal output part configured to output the control signal generated based on the drive command received from the external source, the drive command containing the rotation direction command designating the first rotation direction of the motor, and a rotation signal, the rotation signal corresponding to a rotational speed of the motor, to the motor driver.

3. A conveyor device comprising:
   the motor control device according to claim 1;
   the motor configured to actuate a conveying mechanism;
   a motor driver configured to receive a control signal for controlling driving of the motor and drive the motor; and
   a control-signal output part configured to output the control signal generated based on the drive command received from the external source, the drive command containing the rotation direction command designating the first rotation direction of the motor, and a rotation signal, the rotation signal corresponding to a rotational speed of the motor, to the motor driver.

4. An image forming apparatus comprising:
   the motor control device according to claim 1;
   the motor;
   a motor driver configured to receive a control signal for controlling driving of the motor and drive the motor; and
   a control-signal output part configured to output the control signal generated based on the drive command received from the external source, the drive command containing the rotation direction command designating the first rotation direction of the motor, and a rotation signal, the rotation signal corresponding to a rotational speed of the motor, to the motor driver.

5. The motor control device of claim 1 wherein the controller is further configured to, when the new piece of the drive command is received from the external source, control rotation reversing of the motor based on a rotation speed of the motor, and a threshold value of the rotation speed of the motor.

6. The motor control device according to claim 5, wherein if the second rotation direction is the reverse of the first rotation direction and the rotational speed of the motor is equal to or smaller than the threshold value, the controller is configured to start up the motor in the reverse direction.

7. The motor control device according to claim 6, wherein if the second rotation direction is the reverse of the first rotation direction and the rotational speed of the motor is larger than the threshold value, the controller is configured to not start up the motor in the reverse direction.

8. The motor control device according to claim 6, wherein if the second rotation direction is the reverse of the first rotation direction and the rotational speed of the motor is larger than the threshold value, the controller is configured to start up the motor in the reverse direction with a limitation imposed on a control voltage of the motor.

9. A motor control method to be performed by a motor control device for driving a motor, the motor control device including a storage part, the motor control method comprising:
   receiving a drive command containing a rotation direction command designating a first rotation direction of the motor from an external source;
   storing, in the storage part, the first rotation direction of the motor indicated by the rotation direction command when the motor is driven using the rotation direction command; and
   controlling, when a new piece of the drive command is received from the external source, rotation reversing of the motor based on a second rotation direction, and the first rotation direction, the second rotation direction being indicated in a new rotation direction command included in the new piece of the drive command.

10. The motor control method according to claim 9 wherein the controlling, when the new piece of the drive command is received from the external source, rotation reversing of the motor is further based on a rotation speed of the motor, and a threshold value of the rotation speed of the motor.

11. The motor control method according to claim 10, wherein the controlling includes, if the second rotation direction is the reverse of the first rotation direction and the rotational speed of the motor is equal to or smaller than the threshold value, starting up the motor in the reverse direction.

12. The motor control method according to claim 11, wherein the controlling includes, if the second rotation direction is the reverse of the first rotation direction and the rotational speed of the motor is larger than the threshold value, not starting up the motor in the reverse direction.

13. The motor control method according to claim 11, wherein the controlling includes, if the second rotation direction is the reverse of the first rotation direction and the rotational speed of the motor is larger than the threshold value, starting up the motor in the reverse direction with a limitation imposed on a control voltage of the motor.

14. A non-transitory computer-readable recording medium containing instructions that, when executed by a computer for driving a motor, the computer including a storage part, cause the computer to perform:
   receiving a drive command containing a rotation direction command designating a first rotation direction of the motor from an external source;
   storing, in the storage part, the first rotation direction of the motor indicated by the rotation direction command when the motor is driven using the rotation direction command; and
   controlling, when a new piece of the drive command is received from the external source, rotation reversing of the motor based on a second rotation direction, and the first rotation direction, the second rotation direction being indicated in a new rotation direction command included in the new piece of the drive command.

* * * * *